US006586897B2

United States Patent
Kim et al.

(12) United States Patent
(10) Patent No.: US 6,586,897 B2
(45) Date of Patent: Jul. 1, 2003

(54) METHOD OF CONTROLLING ALIGNMENT OF A ROTATOR OF SRM AND SRM DRIVING CIRCUIT FOR REALIZING THE SAME

(75) Inventors: Sang-Young Kim, Seoul (KR); Jun-Young Lim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/826,016

(22) Filed: Apr. 5, 2001

(65) Prior Publication Data
US 2001/0045095 A1 Nov. 29, 2001

(30) Foreign Application Priority Data
May 4, 2000 (KR) .................. 10-2000-24052

(51) Int. Cl.⁷ .............................................. H02K 23/00
(52) U.S. Cl. ...................................... 318/254; 318/701
(58) Field of Search ............................ 318/138, 254, 318/798–811, 701, 700

(56) References Cited

U.S. PATENT DOCUMENTS 3,919,608 A * 11/1975 Usami et al. ............... 318/138
6,181,092 B1 * 1/2001 Turner ........................ 318/254
6,384,564 B1 * 5/2002 Pollock ....................... 318/701

* cited by examiner

Primary Examiner—Khanh Dang
(74) Attorney, Agent, or Firm—Birch, Stewart, Kolasch & Birch, LLP

(57) ABSTRACT

Disclosed is a method of controlling alignment of a rotor of an SRM with respect to a stator, the SRM including a stator having a plurality of diametrically opposed stator salient magnetic pole pairs around each which each of a plurality of phase coils is wound, and a rotor disposed about a shaft within the stator and having a plurality of diametrically opposed rotor salient pole pairs, comprising the steps of: (a) applying a voltage pulse having an identical magnitude to each phase coil surrounding the plurality of pairs of stator salient magnetic poles in a plurality of respective motor phases of a stator of the SRM upon the initial starting of the SRM; (b) detecting current flowing into the each phase coil in the plurality of respective motor phases in accordance to the application of the voltage pulse; (c) comparing the respective magnitude values of the detected current in the respective motor phases with each other; and (d) bringing rotor salient pole pair of the rotor into alignment with a corresponding pair of stator salient poles of a motor phase with a phase coil into which current of the lowest level flows with the result of the comparison.

9 Claims, 5 Drawing Sheets

METHOD OF CONTROLLING ALIGNMENT OF A ROTATOR OF SRM AND SRM DRIVING CIRCUIT FOR REALIZING THE SAME

BACKGROUND OF THE INVENTION

1. Field of the Invention

The present invention relates to a switched reluctance motor (hereinafter, referred to as "SRM"), and more particularly, a method of controlling alignment of a rotor of an SRM with respect to a stator and an SRM driving circuit for realizing the same in which current flowing into phase coils surrounding each stator salient pole pair in respective motor phases of a stator of the SRM is detected upon the starting of the SRM to compare the magnitude values of the detected current with each other so that the alignment of a rotor with respect to the stator is controlled in such a fashion that rotor salient pole pair of the rotor is brought into alignment with a corresponding stator salient pole pair of a specific motor phase with a phase coil into which current of the lowest level flows, thereby shortening the starting time of the SRM and reducing a noise generated upon the initial alignment of the rotor with respect to the stator.

2. Description of the Related Art

A synchronous motor is a type of an alternating current (AC) motor, in which a change of an excitation state of the motor allows for adjustment of its power-factor, and which rotates at a synchronous speed despite a variation of a load.

The SRM has the same characteristics as that of such a synchronous motor, but refers to a motor which does not have a direct current (DC) excitation state and operates synchronously by a reluctance torque produced by an unbalanced distribution of a magnetic reluctance due to the relative position between the stator salient pole pairs of the stator and the rotor salient pole pairs of the rotor.

FIG. 1 is a cross-sectional view illustrating an example of a typical three-phase SRM.

Referring to FIG. 1, there is shown a three-phase SRM 100 including a stator having a plurality of radially inwardly extending stator poles 101p configured as diametrically opposed stator salient magnetic pole pairs A—A, B—B, C—C around each which a phase coil (i.e., the windings around any two diametrically opposed stator salient poles connected in series or in parallel to define a motor phase) 101c is wound, and a rotor 102 disposed about a shaft within the stator 101 and having a plurality of radially outwardly extending rotor poles 102p configured as diametrically opposed rotor salient pole pairs for rotating by a reluctance torque produced by an unbalanced distribution of a magnetic reluctance due to the relative position between the stator salient pole pairs 101p of the stator 101 and the rotor salient pole pairs 102p of the rotor 102.

The driving of the SRM 100 having such a configuration requires detection of the position of the rotor 102. At least one sensor is generally used to detect the position of the rotor 102. In the case of a single sensor three-phase SRM using one sensor for detecting the position of the rotor 102, a pair of rotor salient pole 102p of the rotor 102 must be aligned previously with a pair of corresponding stator salient pole 101p, i.e., A—A, B—B, or C—C of the stator 101 in a predetermined motor phase for the initial starting of the SRM 100. However, in such a three-phase SRM 100, when the pair of rotor salient pole 102p is brought into misalignment with the pair of corresponding stator salient pole A—A, B—B, or C—C in the predetermined motor phase, it cannot be moved toward the precise alignment position with the corresponding stator salient pole pair A—A, B—B, or C—C. In order to resolve the above misalignment problem, as shown in FIG. 2, the prior art has adopted a method in which the nearest rotor salient pole pair 102p is aligned sequentially with each corresponding stator salient pole pair 101p in each motor phase in the order of phase A→phase B→phase C in three motor phases (i.e., phase A, phase B and phase C) to bring the nearest rotor salient pole pair 102p into alignment with the corresponding stator salient pole pair 101p in a desired phase among three motor phases A, B and C while avoiding the misalignment, and a method in which the nearest rotor salient pole pair 102p is aligned sequentially with each corresponding stator salient pole pair 101p in each motor phase in the order of phase A→phase B in three motor phases A, B and C to bring the nearest rotor salient pole pair 102p into alignment with the corresponding stator salient pole pair 101p in a desired phase among three motor phases A, B and C while avoiding the misalignment. At this time, a voltage pulse is applied to the phase coil surrounding the corresponding stator salient pole pair 101p in the desired phase so that the nearest rotor salient pole pair 102p is brought into alignment with the corresponding stator salient pole pair 101p. That is, as shown in FIG. 2, the voltage pulse having a constant width is first applied to the phase coil surrounding the corresponding stator salient pole pair 101p at a relatively long interval. Then, after applying the voltage pulse several times, the interval of the voltage pulse is reduced gradually and the voltage pulse is applied continuously until its interval is reduced to a desired interval to bring the nearest rotor salient pole pair 102p into alignment with the corresponding stator salient pole pair 101p around which the energized phase coil is wound in a desired phase.

However, in the above conventional rotor alignment method, after the nearest rotor salient pole pair 102p is first aligned with a corresponding stator salient pole pair 101p for a desired phase among three motor phases A, B and C, the nearest rotor salient pole pair 102p is aligned with a corresponding stator salient pole pair 101p around which an energized phase coil is wound for the next phase. At this time, in alignment of each rotor salient pole pair of the rotor 102 of the SRM 100, the farther a rotor salient pole pair 102p of the rotor 102 is from a corresponding stator salient pole pair 101p for alignment, the more current become to flow into the phase coil (the windings) 101c surrounding the corresponding stator salient pole pair 101p. Moreover, such large amount of current generates a high noise when bringing each rotor salient pole pair 102p of the rotor 102 into alignment with each corresponding stator salient pole pair 101p of the stator 101. Further, as described above, the nearest rotor salient pole pair is aligned sequentially with each corresponding stator salient pole pair in each corresponding motor phase in three phases or two phases alignment manner in order to avoid the misalignment of the rotor, thereby lengthening the starting time of the motor.

SUMMARY OF THE INVENTION

Therefore, the present invention has been made in view of the above-mentioned problems, and it is an object of the present invention to provide a method of controlling alignment of a rotor of an SRM and an SRM driving circuit for realizing the same which shortens the starting time of the SRM and reduces a noise generated upon the initial alignment of each rotor salient pole pair of the rotor with respect to each corresponding stator salient pole pair of the stator.

According to one aspect of the present invention, there is provided a method of controlling alignment of a rotor of an SRM with respect to a stator, the SRM including a stator having a plurality of diametrically opposed stator salient magnetic pole pairs around each which each of a plurality of phase coils is wound, and a rotor disposed about a shaft within the stator and having a plurality of diametrically opposed rotor salient pole pairs, comprising the steps of:

(a) applying a voltage pulse having an identical magnitude to each phase coil surrounding the plurality of pairs of stator salient magnetic poles in a plurality of respective motor phases of a stator of the SRM upon the initial starting of the SRM;

(b) detecting current flowing into the each phase coil in the plurality of respective motor phases, respectively, in accordance to the application of the voltage pulse;

(c) comparing the respective magnitude values of the detected current in the respective motor phases with each other; and (d) bringing rotor salient pole pair of the rotor into alignment with a corresponding pair of stator salient poles of a motor phase with a phase coil into which current of the lowest level flows with the result of the comparison.

Preferably, in the step (a), the voltage pulse may be sequentially applied to the each phase coil surrounding the plurality of diametrically opposed stator salient magnetic pole pairs in the plurality of respective motor phases of the stator of the SRM.

Preferably, the steps (a) and (b) may be repeatedly performed several times to improve reliability for the comparison of the magnitude values of the detected current in the step (c).

Also, preferably, the step (b) is performed in a predetermined point of time before the value of the voltage pulse value becomes zero (0) after the application of the voltage pulse.

Preferably, the step (c) may be performed by mutual comparison of values obtained by accumulatively adding the respective magnitude values of the current in the respective motor phases detected in the step (b).

Also, preferably, the step (d) may be performed by applying the voltage pulse having a constant width to the phase coil of the motor phase into which the current of the lowest level flows in such a fashion that the interval of the voltage pulse is reduced gradually, or by applying the voltage pulse having the constant width to the phase coil of the motor phase into which the current of the lowest level flows in such a fashion that upper and lower current limits of the current to flow into the phase coil are preset and the application of the voltage pulse is interrupted if the current reaches the upper current limit and the voltage pulse is applied again if the current reaches the lower current limit.

According to another aspect of the present invention, there is also provided a driving circuit for driving an SRM, the SRM including a stator having a plurality of diametrically opposed stator salient magnetic pole pairs around each which each of a plurality of phase coils is wound, and a rotor disposed about a shaft within the stator and having a plurality of diametrically opposed rotor salient pole pairs, comprising:

a plurality of switching means adapted to switch on/off the flow of current into each of the plurality of phase coils surrounding each of the plurality of diametrically opposed stator salient magnetic pole pairs of the stator, the plurality of the switching means each being connected in series across each of the phase coils;

a plurality of diodes adapted to control the inputting and outputting of the current into and from each of the phase coils only in the one direction, the plurality of the diodes each being connected in parallel to a current input terminal and a current output terminal of each of the phase coils; and a resistor adapted to detect the current flowing into each of the phase coils, the resistor being connected in series to the current output terminal of each phase coil.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in detail to the preferred embodiments of the present invention.

Figure 3:
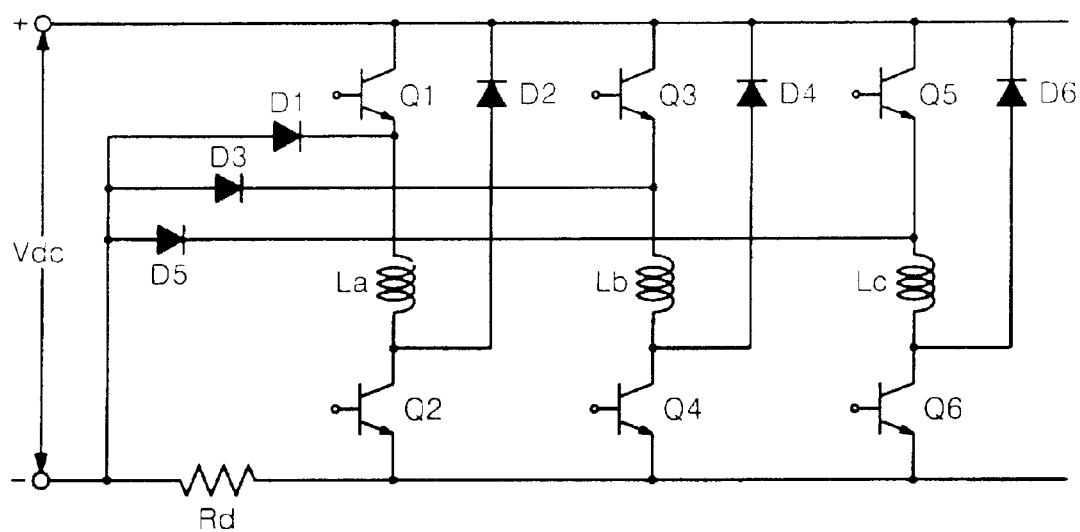
FIG. 3 is a circuit diagram illustrating the construction of an SRM according to the present invention.

FIG. 3 is a circuit diagram illustrating the construction of an SRM according to the present invention.

Figure 1:
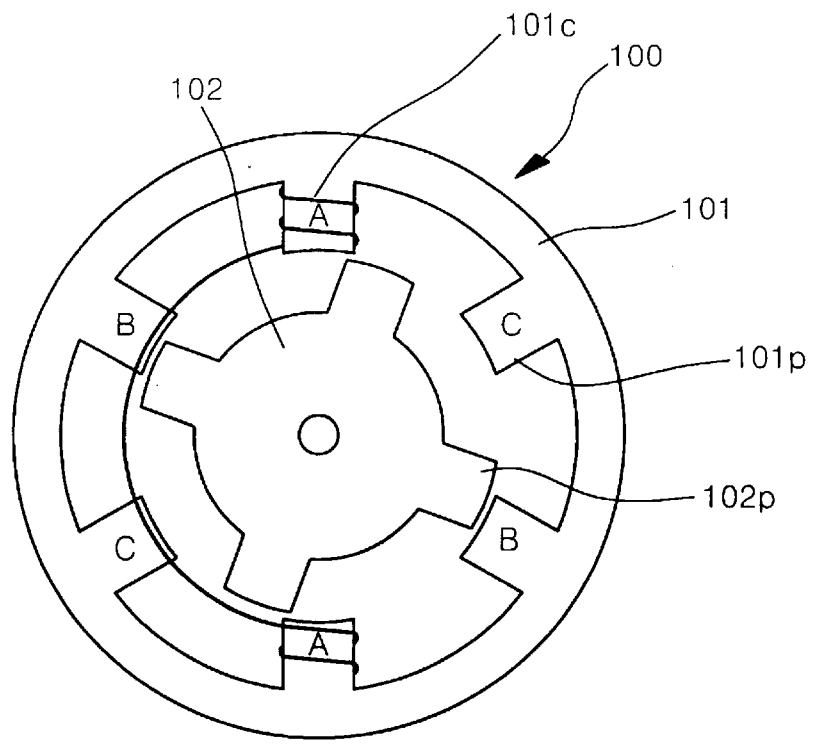
FIG. 1 is a cross-sectional view illustrating an example of a typical three-phase SRM.
Figure 2:
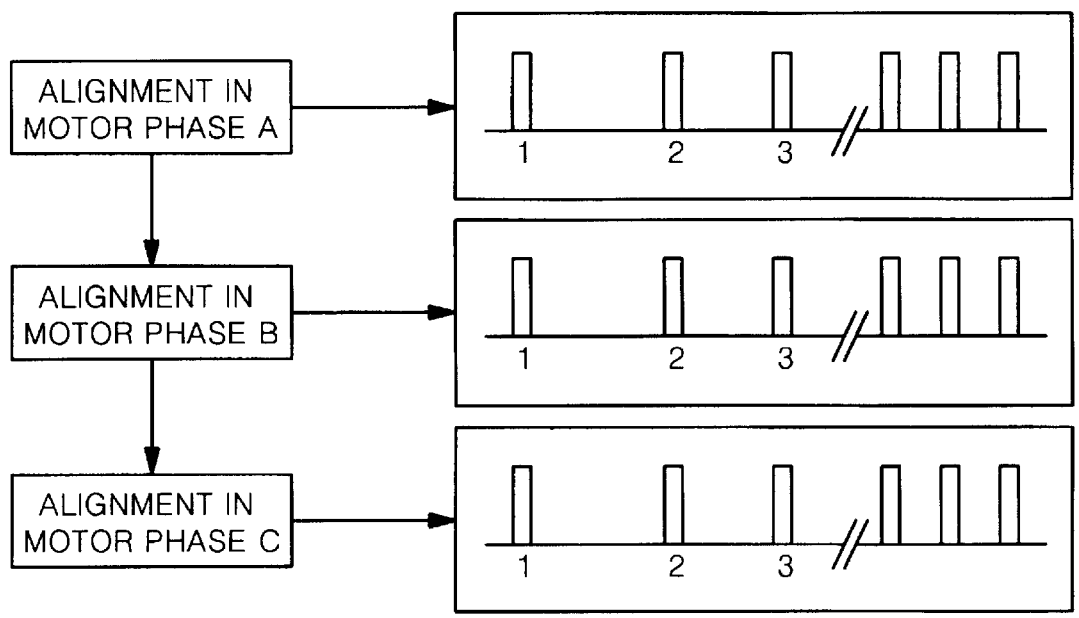
FIG. 2 is a conceptional view illustrating a rotor alignment scheme in a typical three-phase SRM according to the prior art.

Referring to FIG. 3, an SRM 100 (see FIG. 1) according to the present invention includes a stator having a plurality of radially inwardly extending stator poles 101p configured as diametrically opposed stator salient magnetic pole pairs A—A, B—B, C—C around each which a phase coil (i.e., the windings around any two diametrically opposed stator salient poles connected in series or in parallel to define a motor phase) 101c is wound, and a rotor 102 disposed about a shaft within the stator 101 and having a plurality of radially outwardly extending rotor poles 102p configured as diametrically opposed rotor salient pole pairs. The driving circuit for driving the SRM according to the present invention includes a plurality of switching element pairs acting as a plurality of transistor pairs Q1–Q6, a plurality of diodes D1–D6, and a resistor RD. Each of the plurality of transistor pairs Q1–Q6 is connected in series across each of the phase coils La, Lb, Lc for switching on/off the flow of current into each phase coil La, Lb, Lc surrounding each pair of stator salient magnetic poles of the stator. The plurality of diodes D1–D6 each is connected in parallel to a current input terminal and a current output terminal of each of the phase coils La, Lb, Lc for controlling the inputting and outputting of the current into and from each phase coil La, Lb, Lc only in the one direction, the plurality of the diodes. The resistor (Rd) is connected in series to the current output terminal of each phase coil La, Lb, Lc for detecting the current flowing into each phase coil La, Lb, Lc.

Figure 4:
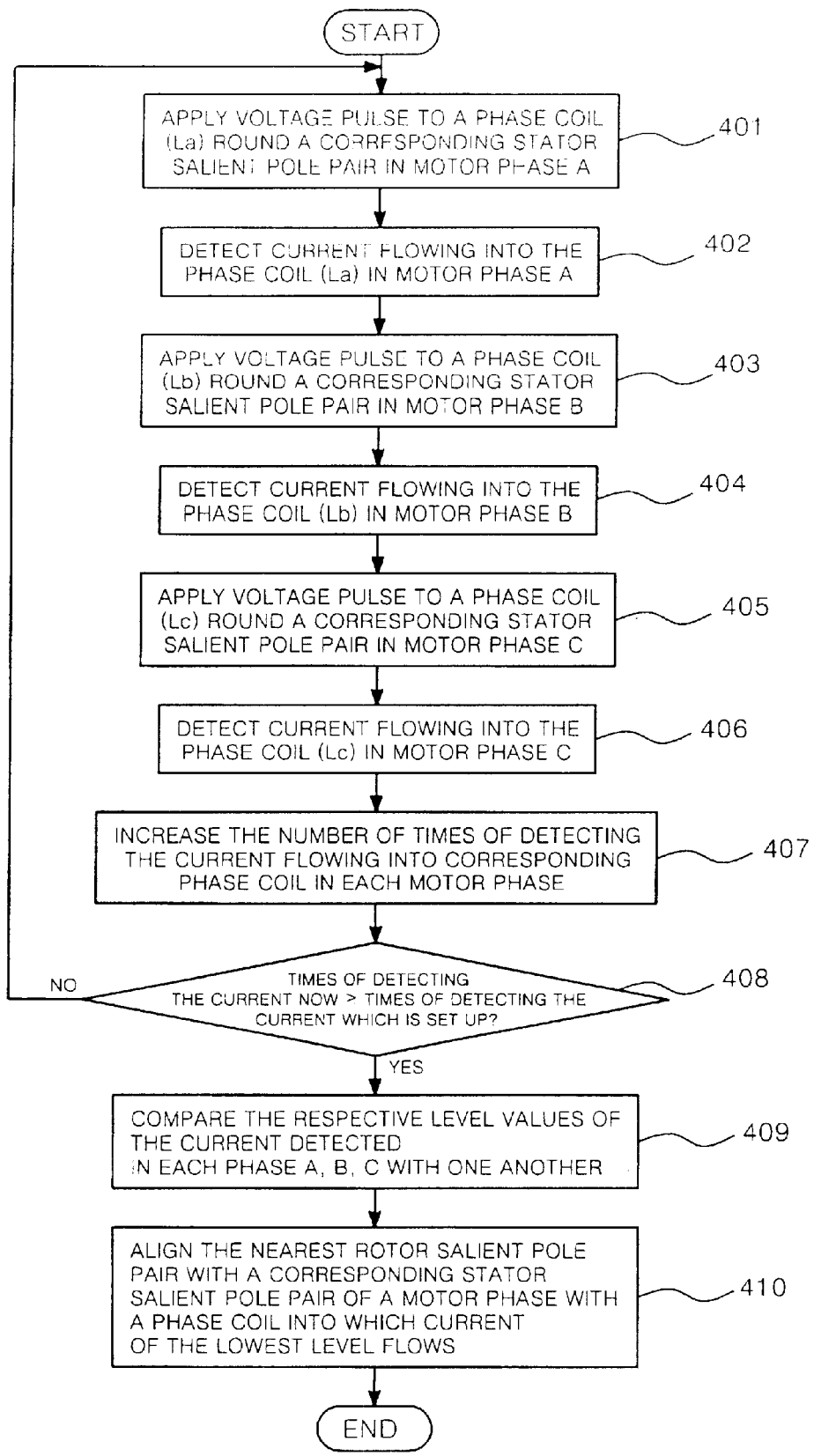
FIG. 4 is a flow chart illustrating the process routine for controlling alignment of a rotor with respect to a stator of an SRM according to the present invention.

FIG. 4 is a flow chart illustrating the process routine for controlling alignment of a rotor with respect to a stator of an SRM according to the present invention.

A process for aligning each rotor salient pole pair with a corresponding stator salient pole pair by a rotor alignment controlling process according to the present invention will now be described in detail hereinafter with reference to FIG. 4.

Figure 5:
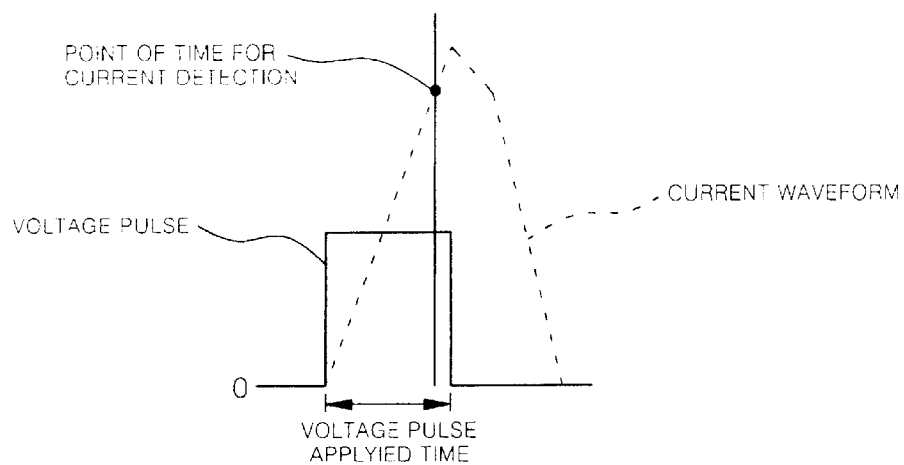
FIG. 5 is a schematic graph illustrating a current detection step according to an application of a voltage pulse to each phase coil surrounding each pair of stator poles in each motor phase in a rotor alignment controlling process according to the present invention.

Referred to FIG. 4, first, a voltage pulse, having a certain width is applied to a phase coil La (see FIG. 3) surrounding a corresponding pair of stator salient magnetic poles A—A in a motor phase A of a stator of the SRM upon the initial starting of the SRM (step 401). Then, the current flowing into the phase coil La in the motor phase A is detected (step 402). That is, in the SRM driving circuit of FIG. 3, when only transistors Q1 and Q2 are first switched on to apply the voltage pulse to phase coil La in the motor phase A, current flows into a microprocessor (not shown) for wholly controlling the present system by way of the transistor Q1, the phase coil La, the transistor Q2, and then a resistor Rd. Therefore, the microprocessor detects the current flowing into the phase coil La in the motor phase A. At this time, preferably, the current detection process may be performed in a predetermined point of time before the value of the voltage pulse becomes zero (0) after the application of the voltage pulse as shown in FIG. 5. Of course, the current may be detected in any point of time after the value of the voltage pulse has become zero (0) after the application of the voltage pulse. However, it should be noted that in view of a waveform characteristics of the current according to the application of the voltage pulse, the value of the current detected in the predetermined point of time before the value of the voltage pulse becomes zero (0) has a higher reliability for its measurement accuracy and detection value as compared with that detected in any point of time after the value of the voltage pulse has become zero (0) after the application of the voltage pulse.

Like this, after the current flowing into the phase coil La in the motor phase A has been detected, the voltage pulse having a certain width is applied to a phase coil Lb (see FIG. 3) surrounding a corresponding pair of stator salient magnetic poles B—B in a motor phase B of the stator of the SRM (step 403). Subsequently, the current flowing into the phase coil Lb in the motor phase B is detected by the microprocessor in the same process that detects the current flowing into the phase coil La in the motor phase A (step 404). After that, the voltage pulse having a certain width is also applied to a phase coil Lc (see FIG. 3) surrounding a corresponding pair of stator salient magnetic poles C—C in a motor phase C of the stator of the SRM (step 405). Then, the current flowing into the phase coil Lc in the motor phase C is detected by the microprocessor in the same process that detects the current flowing into the phase coils La and Lb in the motor phases A and B (step 406).

As described above, when the current flowing into corresponding phase coils La, Lb, Lc in respective motor phases A, B, C is detected once, the number of times of detecting the current flowing into the corresponding phase coil La, Lb, Lc in respective motor phases A, B, C is increased to repeatedly perform the steps 401 through 406 (step 407). Here, the aim of repeatedly performing the steps 410 through 406 is to improve reliability for mutual comparison of the detected values of the current flowing into the corresponding phase coil La, Lb, Lc in respective motor phases A, B, C. In addition, the corresponding detected current values of respective motor phases obtained by repeatedly performing the steps 401 through 407 are added accumulatively by motor phase to compare the accumulatively added corresponding current values of the respective motor phases with one another.

Like this, when detection of the current flowing into a corresponding phase coil La, Lb, Lc in respective motor phases A, B, C is performed several times, the microprocessor determines whether or not the present number of times of current detection in respective motor phases is equal to or larger than the predetermined number of times of current detection (step 408). At step 408, if it is determined that the answer is NO, i.e., that the present number of times of current detection in respective motor phases is not equal to or larger than the predetermined number of times of current detection, the program returns to step 401 at which the microprocessor performs the previous steps 401 through 406. On the other hand, if it is determined at step 408 that the answer is YES, i.e., that the present number of times of current detection in respective motor phases is equal to or larger than the predetermined number of times of current detection, the program proceeds to subsequent step 409 where the microprocessor compares the detected values of the current flowing into the corresponding phase coils La, Lb, Lc in respective motor phases A, B, C with one another. At this time, of course, the respective detected current values added accumulatively by motor phase are compared with one another. Here, it should be noted that the comparison process is not limited to the mutual comparison of the corresponding sum total of the respective detected current values added accumulatively by motor phase, but the respective mean values obtained by dividing the corresponding sum total of the respective accumulatively added current values by the number of times of current detection may be compared with one anther according to circumstances.

Like this, when the comparison process of the respective detected current values of each motor phase is completed, the nearest rotor salient pole pair is brought into alignment with a corresponding stator salient pole pair of a motor phase with a phase coil into which current of the lowest level flows among the phase coils La, Lb, Lc Ta to control alignment of the rotor with respect to the stator upon the initial starting of the SRM (step 410). Thus, the rotor alignment controlling routine is concluded.

Figure 6:
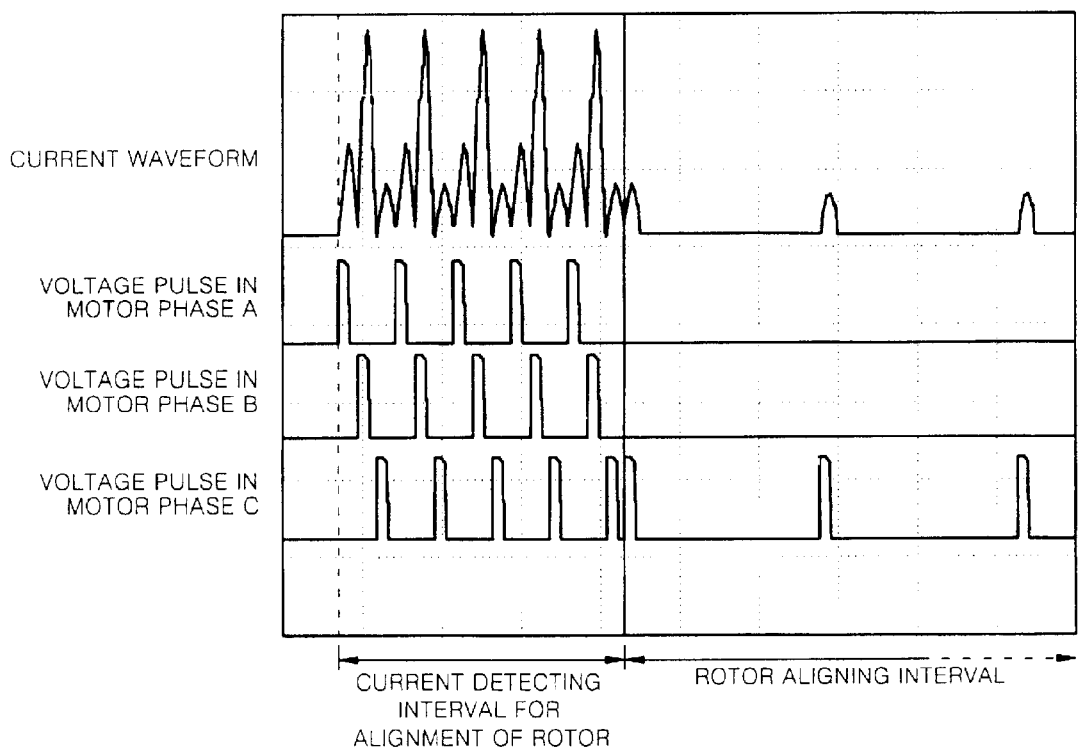
FIG. 6 is a timing chart illustrating the waveforms of a voltage pulse applied to a corresponding stator salient pole pair in respective motor phases and its current waveforms for explaining a process for searching the nearest motor phase for alignment of the motor in accordance to the rotor alignment controlling process according to the present invention.

FIG. 6 is a timing chart illustrating the waveforms of a voltage pulse in respective motor phases and its current waveforms for explaining a process in which after the voltage pulse is applied sequentially to corresponding phase coils La, Lb, Lc in respective motor phases A, B, C five times, the corresponding current values detected five times in respective motor phases A, B, C are added accumulatively by motor phase to compare the accumulatively added respective corresponding current values with one another so that the nearest rotor salient pole pair is brought into alignment with a corresponding stator salient pole pair of a motor phase with a phase coil into which current of the lowest level flows in accordance to the rotor alignment controlling process according to the present invention.

As shown in FIG. 6, it can be seen that the current generated through the phase coil Lc surrounding the stator salient pole pair C—C in the motor phase C has the lowest level value. Finally, a voltage pulse is applied to the phase coil Lc so that the nearest rotor salient pole pair is brought into alignment with a corresponding stator salient pole pair C—C of a motor phase C with a phase coil Lc into which current of the lowest level flows. At this time, the voltage pulse having a constant width is applied to the phase coil Lc of the motor phase C into which the current of the lowest level flows in such a fashion that the interval of the voltage pulse is reduced gradually.

Here, additionally, a process for determining the motor phase C as the nearest motor phase for alignment of the rotor with respect to the stator will be described hereinafter.

Inductance for a phase coil surrounding a corresponding stator salient magnetic pole pair in a motor phase in the SRM is determined by a relative position between the rotor and the stator.

Figure 7:
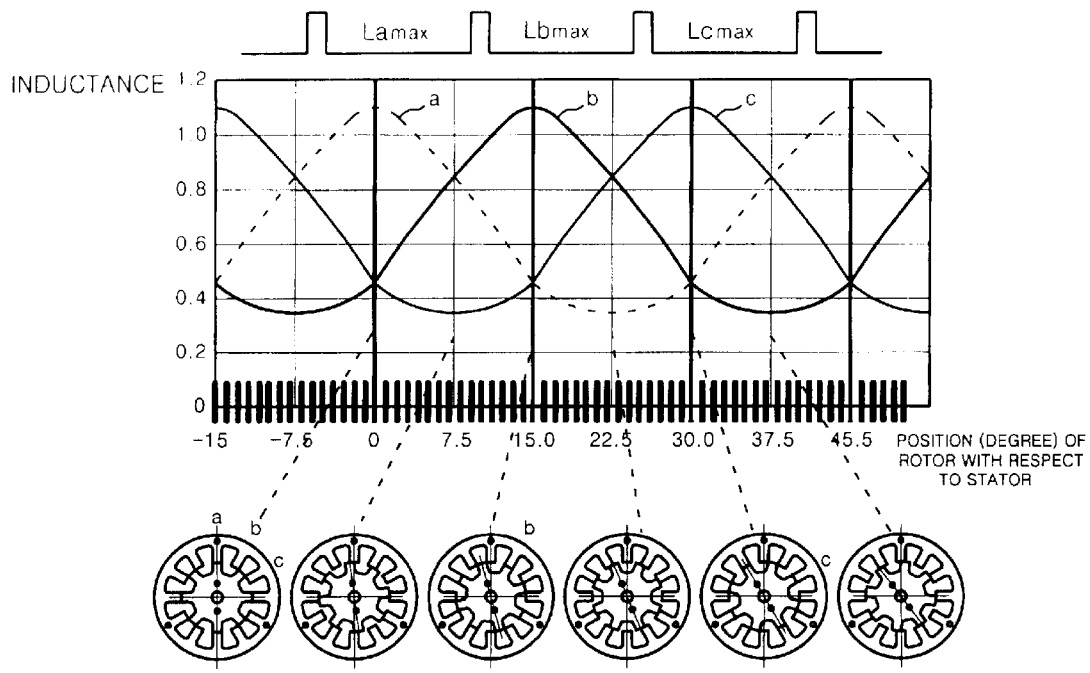
FIG. 7 is a graphical view illustrating a variation of inductance for a corresponding phase coil round each pair of stator salient poles in each motor phase with respect to a corresponding pair of rotor salient poles in a typical three-phase SRM.

FIG. 7 is a graphical view illustrating a variation of inductance for a corresponding phase coil round each pair of stator salient poles in each motor phase with respect to a corresponding pair of rotor salient poles in a typical three-phase SRM including a stator with 12 salient poles, i.e., 6 pairs of salient poles and a rotor with 8 salient poles, i.e., 4 pairs of salient poles.

It can be seen from FIG. 7 that inductance for a corresponding phase coil round each pair of stator salient poles in each motor phase with respect to a corresponding pair of rotor salient poles exhibits the maximum value when the rotor salient poles are brought into alignment with the stator salient poles.

In the above SRM, in the standstill state of the rotor, a voltage applied to a phase coil in a motor phase can be written by the following Expression:

$$V = L \, di/dt.$$

Accordingly, current i flowing into a phase coil in a motor phase can be written by the following [Expression 1].

$$i = \int \frac{v}{L} dt \qquad \text{[Expression 1]}$$

Here, L denotes inductance determined by a relative position between the stator and the rotor.

It can be seen from the [Expression 1] that a voltage pulse having a constant width is applied to the phase coil Lc of the motor phase C into which the current of the lowest level flows, current i is determined by inductance L, and its magnitude is inversely proportional to inductance L. Accordingly, the nearer each rotor salient pole pair approaches a motor phase for alignment with corresponding stator salient pole pair, i.e., the larger the inductance L becomes, the smaller the magnitude value of the current i flowing into corresponding phase coils in respective motor phases becomes. On the other hand, the farther each rotor salient pole pair goes from the motor phase for alignment with corresponding stator salient pole pair, i.e., the smaller the inductance L becomes, the larger the magnitude value of the current i flowing into corresponding phase coils in respective motor phases becomes.

The present invention is implemented using the above-mentioned principle. Accordingly, the motor phase C with a phase coil Lc into which current of the lowest level flows is determined as the nearest motor phase for alignment of the rotor with respect to the stator on the basis of the result as shown in FIG. 6.

Figure 8:
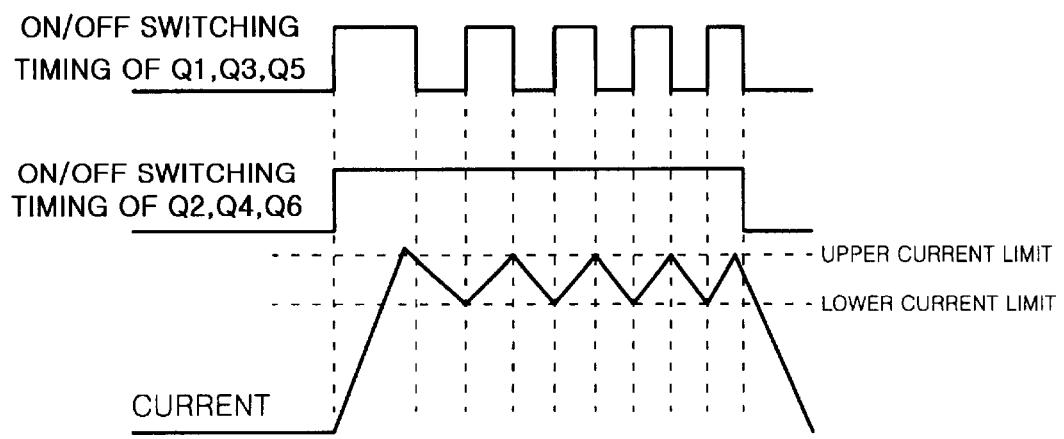
FIG. 8 is a timing chart illustrating a voltage pulse applying scheme using current limits when applying a voltage pulse to a corresponding stator salient pole pair in the nearest motor phase for alignment of the rotor determined in accordance to the rotor alignment controlling process according to the present invention.

FIG. 8 is a timing chart illustrating a voltage pulse applying scheme using current limits when applying a voltage pulse to a corresponding stator salient pole pair in the nearest motor phase for alignment of the motor determined in accordance to the rotor alignment controlling process according to the present invention.

In the meanwhile, in the process in which a voltage pulse having a constant width is applied to the corresponding phase coils of the respective motor phases to determine the nearest motor phase C into which the current of the lowest level flows for alignment of the rotor with respect to the stator, the voltage pulse having the constant width may be applied to the phase coil Lc of the nearest motor phase C in such a fashion that the interval of the voltage pulse is reduced gradually, but, as shown in FIG. 8, the voltage pulse may be applied to the phase coil Lc of the nearest motor phase C in such a fashion that upper and lower current limits of the current to flow into the phase coil are preset and the application of the voltage pulse is interrupted if the current reaches the upper current limit and the voltage pulse is applied again if the current reaches the lower current limit. The greatest difference between these two schemes is that while the former scheme applies a voltage pulse having a constant width to the phase coil Lc of the motor phase C, the latter scheme causes fluctuation of a width of the applied voltage pulse. In the case of using the former scheme, since a voltage pulse having a constant width is applied to the phase coil Lc of the motor phase C to bring the nearest rotor salient pole pair into alignment with a corresponding pair of stator salient poles of the motor phase C, when a corresponding rotor salient pole pair approaches the nearest motor phase C for alignment of the rotor with respect to the stator, there may often occur the possibility that the corresponding rotor salient pole pair will be deviated from the nearest motor phase C. However, in the case of the latter scheme which is designed in view of the above-mentioned problem of the former scheme, since the voltage pulse is applied to the phase coil Lc of the nearest motor phase C while maintaining a level of the current to flow into the phase coil Lc in the nearest motor phase C within the preset upper and lower current limits, i.e. while varying the width of the applied voltage pulse, the nearest rotor salient pole pair can be more precisely brought into alignment with a corresponding stator salient magnetic pole pair in the motor phase C as compared with the former scheme.

As can be seen from the foregoing, the rotor alignment controlling process according to the present invention has an advantage that current flowing into phase coils surrounding each stator salient pole pair in respective motor phases of a stator of the SRM is detected upon the starting of the SRM to compare the magnitude values of the detected current with each other so that a motor phase with a phase coil into which current of the lowest level flows is determined as the nearest motor phase for alignment of the rotor with respect to the stator and the nearest rotor salient pole pair is more precisely brought into alignment with a corresponding stator salient pole pair in the motor phase, thereby shortening the starting time of the SRM and reducing a noise generated upon the initial alignment of the rotor with respect to the stator.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A method of controlling alignment of a rotor of an SRM with respect to a stator, the SRM including a stator having a plurality of diametrically opposed stator salient magnetic pole pairs around each which each of a plurality of phase coils is wound, and a rotor disposed about a shaft within the stator and having a plurality of diametrically opposed rotor salient pole pairs, comprising the steps of:

(a) applying a voltage pulse having an identical magnitude to each phase coil surrounding the plurality of pairs of stator salient magnetic poles in a plurality of respective motor phases of a stator of the SRM upon the initial starting of the SRM;

(b) detecting current flowing into the each phase coil in the plurality of respective motor phases, respectively, in accordance to the application of the voltage pulse;

(c) comparing the respective magnitude values of the detected current in the respective motor phases with each other; and (d) bringing rotor salient pole pair of the rotor into alignment with a corresponding pair of stator salient poles of a motor phase with a phase coil into which current of the lowest level flows with the result of the comparison.

2. The method according to claim 1, wherein in the step (a), the voltage pulse is sequentially applied to the each phase coil surrounding the plurality of diametrically opposed stator salient magnetic pole pairs in the plurality of respective motor phases of the stator of the SRM.

3. The method according to claim 1 wherein the step (b) is performed in a predetermined point of time before the value of the voltage pulse becomes zero (0) after the application of the voltage pulse.

4. The method according to claim 3, wherein the steps (a) and (b) are repeatedly performed several times to improve reliability for the comparison of the magnitude values of the detected current in the step (c).

5. The method according to claim 1, wherein the step (c) may be performed by mutual comparison of values obtained by accumulatively adding the respective magnitude values of the current in the respective motor phases detected in the step (b).

6. The method according to claim 1, wherein the step (d) is performed by applying the voltage pulse having a constant width to the phase coil of the motor phase into which the current of the lowest level flows in such a fashion that the interval of the voltage pulse is reduced gradually.

7. The method according to claim 1, wherein the step (d) is performed by applying the voltage pulse having the constant width to the phase coil of the motor phase into which the current of the lowest level flows in such a fashion that upper and lower current limits of the current to flow into the phase coil are preset and the application of the voltage pulse is interrupted if the current reaches the upper current limit and the voltage pulse is applied again if the current reaches the lower current limit.

8. A driving circuit for driving an SRM, the SRM including a stator having a plurality of diametrically opposed stator salient magnetic pole pairs around each which each of a plurality of phase coils is wound, and a rotor disposed about a shaft within the stator and having a plurality of diametrically opposed rotor salient pole pairs, comprising:

a plurality of switching means adapted to switch on/off the flow of current into each of the plurality of phase coils surrounding each of the plurality of diametrically opposed stator salient magnetic pole pairs of the stator, the plurality of the switching means each being connected in series across each of the phase coils;

a plurality of diodes adapted to control the inputting and outputting of the current into and from each of the phase coils only in the one direction, the plurality of the diodes each being connected in parallel to a current input terminal and a current output terminal of each of the phase coils; and a resistor adapted to detect the current flowing into each of the phase coils, the resistor being connected in series to the current output terminal of each phase coil.

9. The driving circuit according to claim 8, wherein the plurality of switching means is transistors.

* * * * *